United States Patent [19]

Link et al.

[11] 4,351,592

[45] Sep. 28, 1982

[54] COLLAPSIBLE MICROFICHE READER ASSEMBLY ESPECIALLY SUITABLE FOR USE IN A DESK DRAWER

[75] Inventors: William T. Link, Berkeley; Steven R. Runyan, Los Atlos Hills; Stephen Hobson, Santa Clara, all of Calif.

[73] Assignee: Datagraphix, Inc., San Diego, Calif.

[21] Appl. No.: 127,239

[22] Filed: Mar. 4, 1980

[51] Int. Cl.³ .............................................. G03B 21/30
[52] U.S. Cl. ...................................... 353/72; 353/119; 353/27 R; 353/77; 353/79
[58] Field of Search ......................... 353/72, 73, 74–79, 353/119, 27 R, 122; 312/20–23, 27, 30; 352/242, 243, 34, 104

[56] References Cited

U.S. PATENT DOCUMENTS

| | | | |
|---|---|---|---|
| 2,455,156 | 11/1948 | Balzi et al. | 312/28 |
| 2,506,168 | 5/1950 | Perillo | 353/72 |
| 2,588,163 | 3/1952 | Ristenpart et al. | 312/28 X |
| 3,431,040 | 3/1969 | Phelps et al. | 312/20 X |
| 3,811,763 | 5/1974 | Cordonnier | 353/77 |
| 3,880,507 | 4/1975 | Adams | 353/119 X |
| 3,997,258 | 12/1976 | Omi | 353/77 X |
| 4,170,408 | 10/1979 | Behr | 353/79 X |

FOREIGN PATENT DOCUMENTS 342846 10/1921 Fed. Rep. of Germany ...... 353/119
2356389 1/1978 France .............................. 312/77 V

*Primary Examiner*—Harry N. Haroian
*Attorney, Agent, or Firm*—Flehr, Hohbach, Test, Albritton & Herbert

[57] ABSTRACT

A microfiche reader assembly especially suitable for use in a desk drawer of typical size is disclosed herein. This assembly includes a housing, a projection screen, a microfiche support arrangement for supporting a microfiche for movement within a given rectangular operating area and an optical arrangement cooperating with the supported microfiche for projecting an enlarged image of a section of the microfiche on to the screen when the microfiche is in its operating area. While this assembly requires more room than the standard desk drawer allots during use, it is made sufficiently collapsible to fit entirely within the confines of the drawer when not in use so as to allow the drawer to be closed. However, at the same time, the assembly is expandable for use within the drawer when the latter is opened, whereby the assembly does not have to be removed.

22 Claims, 16 Drawing Figures

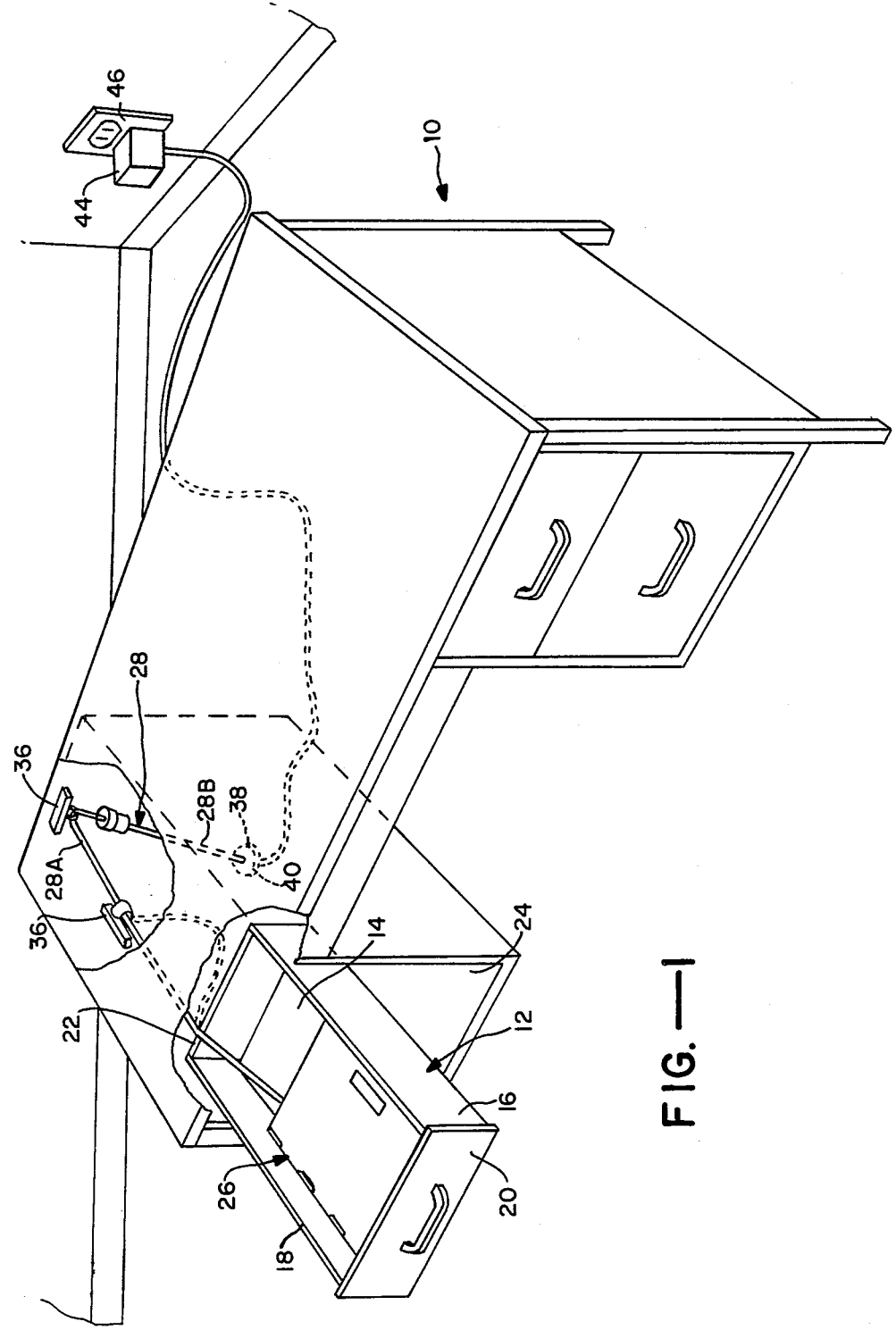
FIG.—1

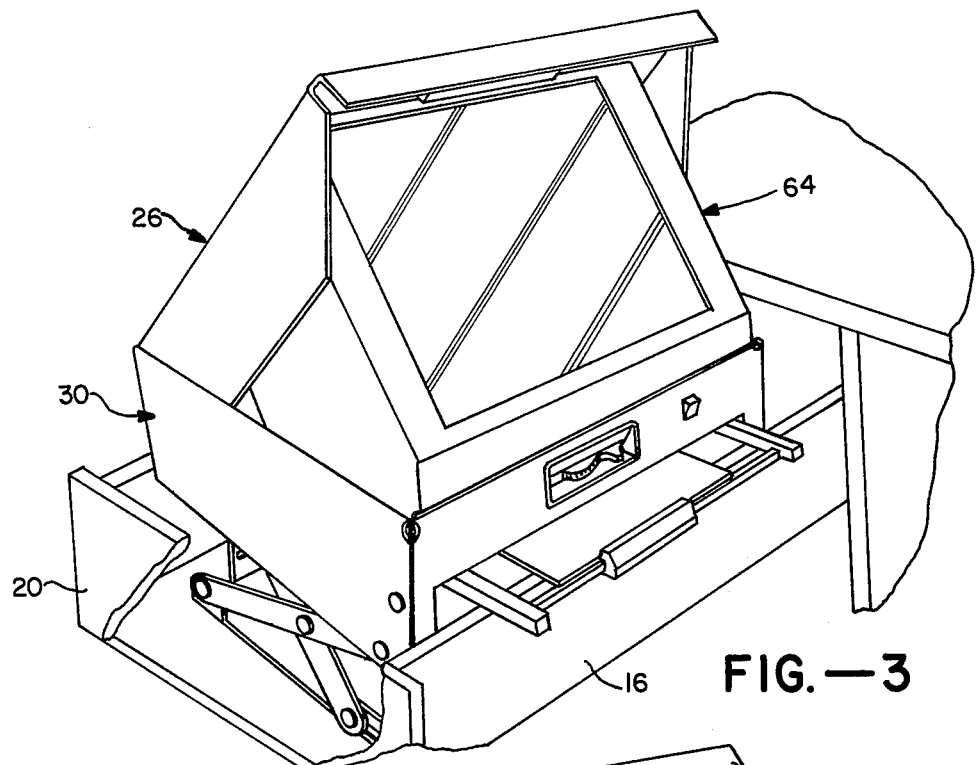
FIG.—3
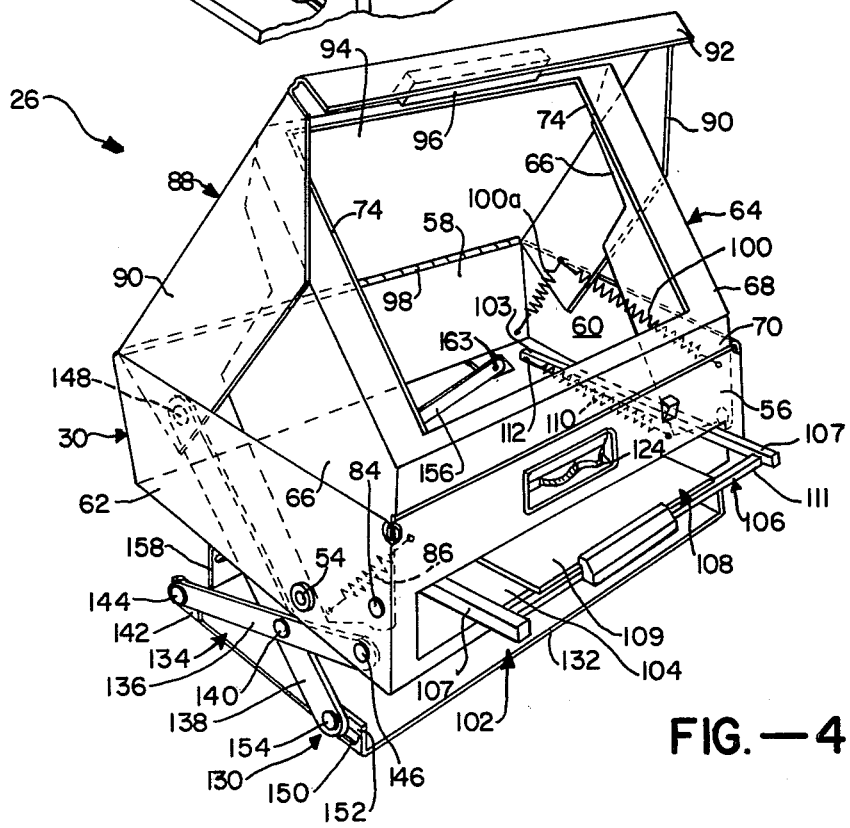
FIG.—4

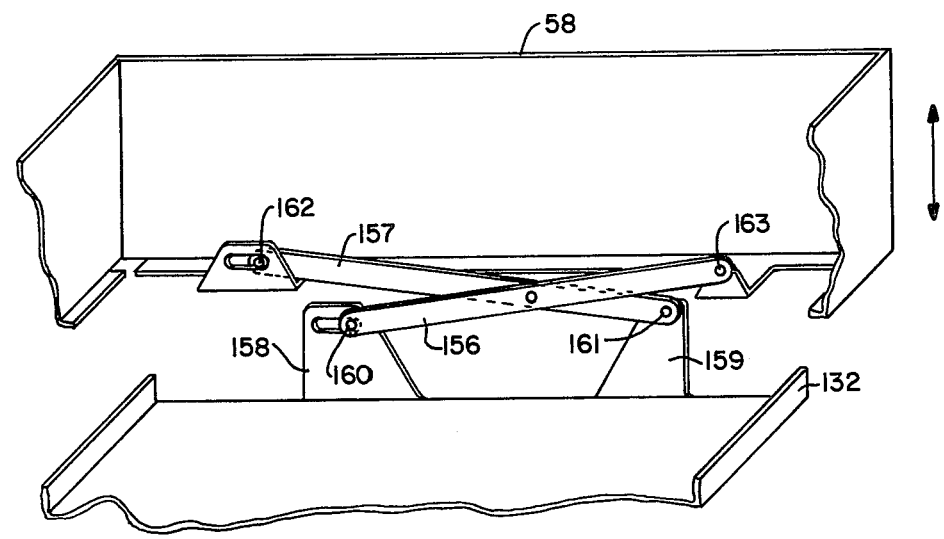
FIG.—5
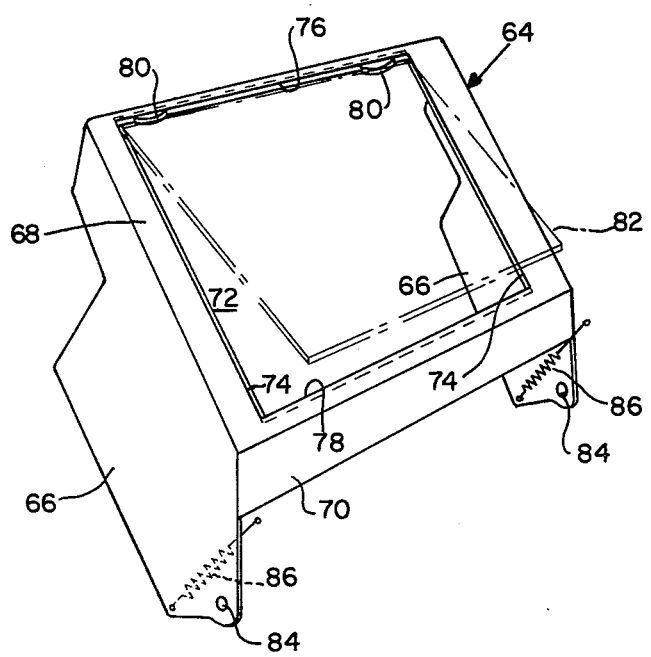
FIG.—6

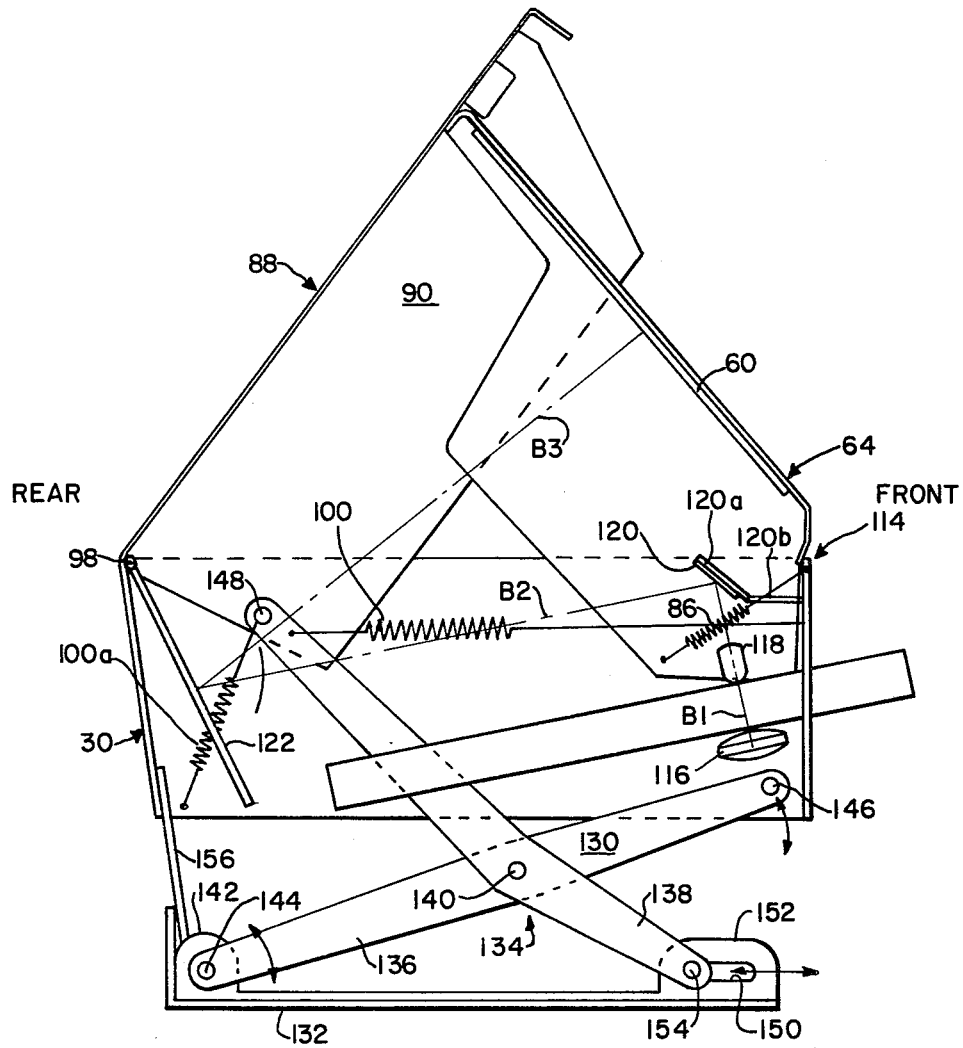
FIG.—7
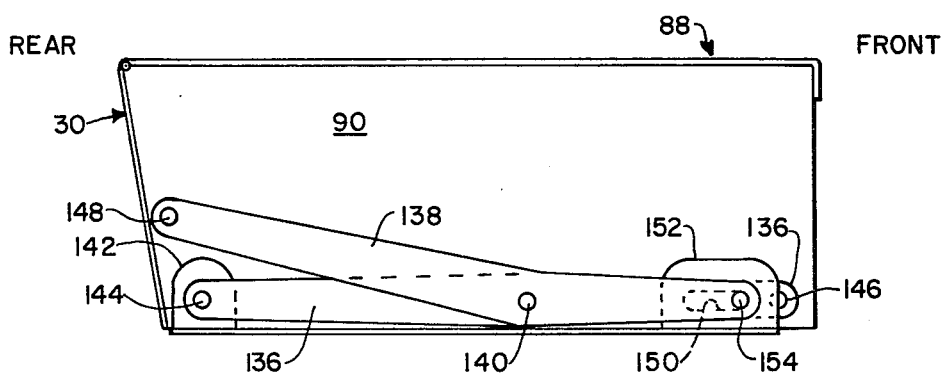
FIG.—8

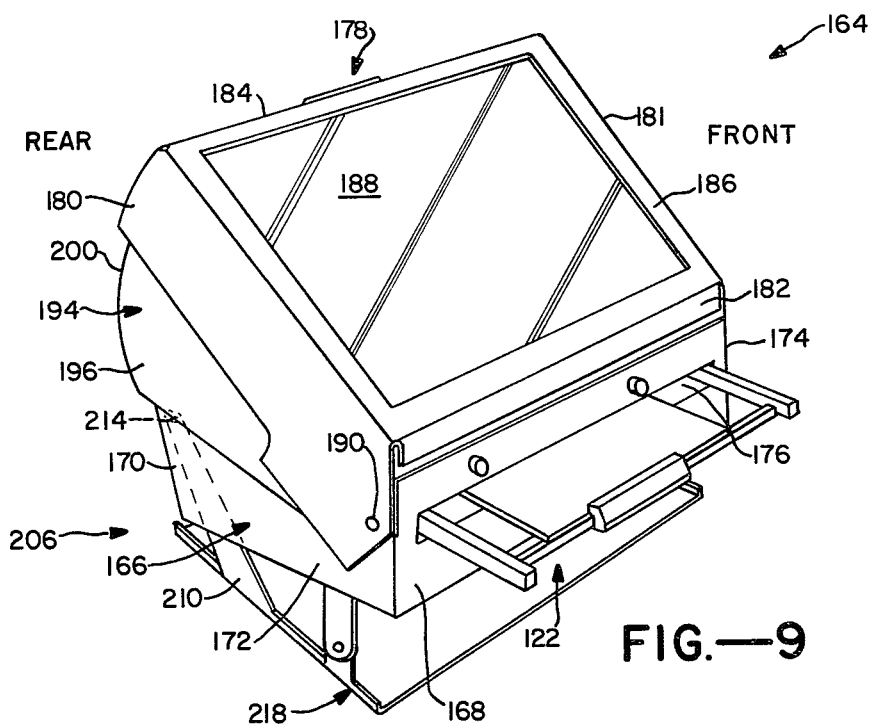
FIG.—9
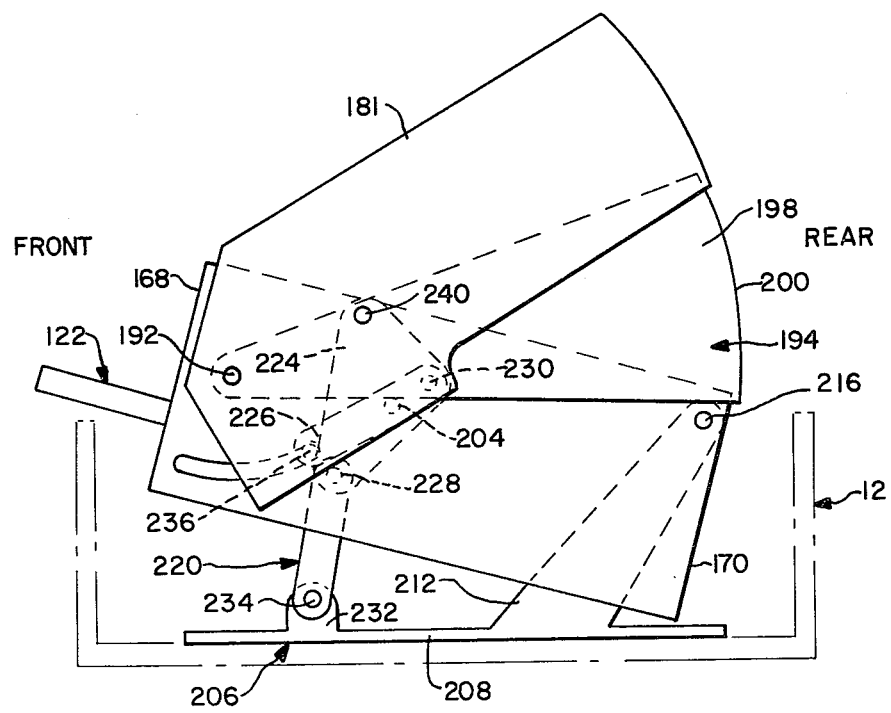
FIG.—10A

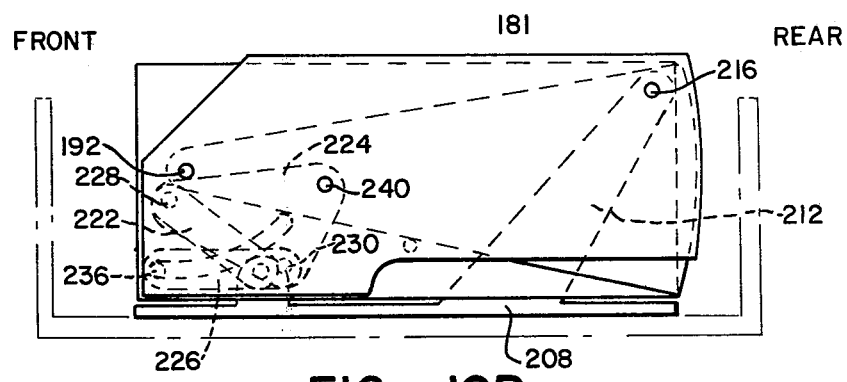
FIG.—10B
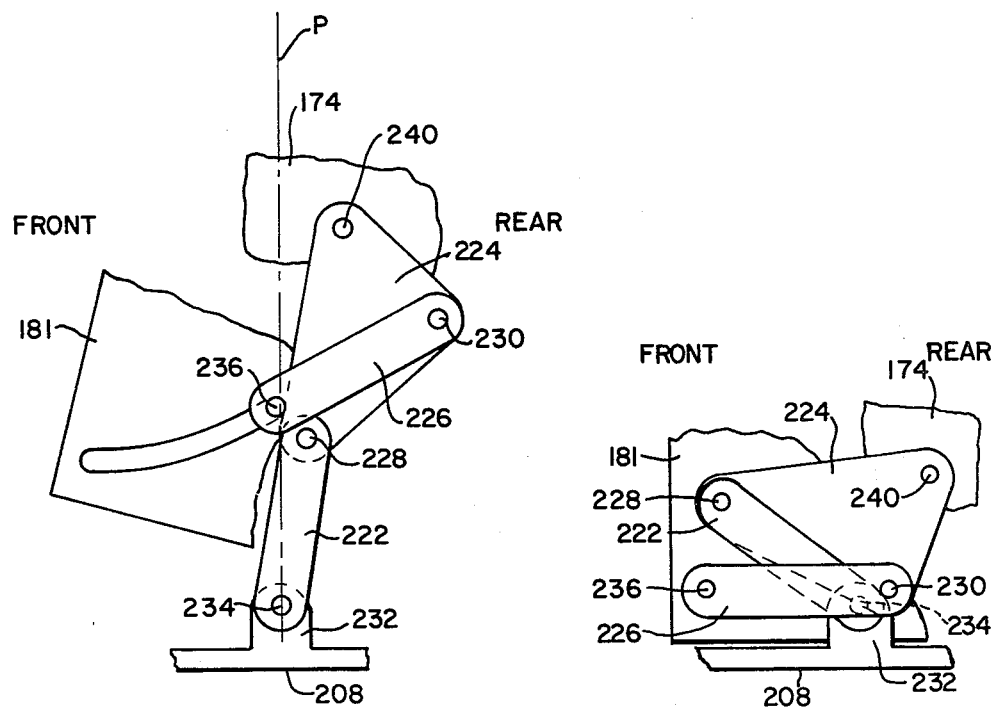
FIG.—11A  FIG.—11B

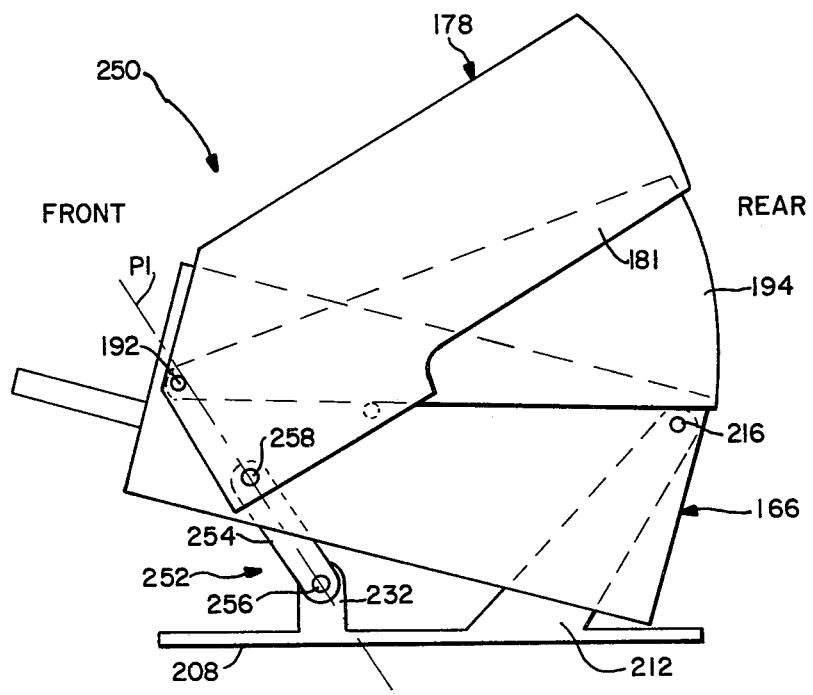
FIG.—12
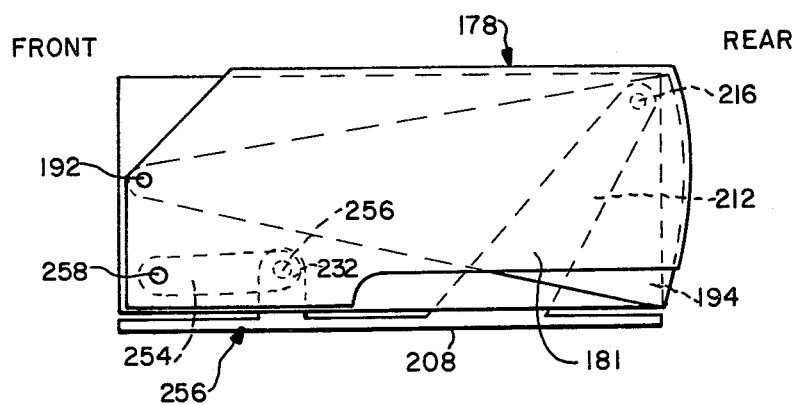
FIG.—13

COLLAPSIBLE MICROFICHE READER ASSEMBLY ESPECIALLY SUITABLE FOR USE IN A DESK DRAWER

The present invention relates generally to microfiche reader assemblies and more particularly to an assembly suitable for use within a desk drawer of standard size.

The typical office desk includes one or more desk drawers which are approximately 24 inches long, 12 inches wide and 5 inches deep. It has been found that a drawer of this size is not sufficiently large to house the usual desk top microfiche reader with the drawer in both opened and closed positions. Therefore, a reader of this type usually remains on the top of the desk where it takes up valuable space when being used and also when not being used. An alternative to this problem resides in the possible use of briefcase readers, some of which may be sufficiently small to fit entirely within the drawer when not in use. However, this type of reader must be removed from the drawer and placed, for example, on the desk when in use.

In view of the foregoing a primary object of the present invention is to provide a microfiche reader assembly which is especially suitable for use in an opened desk drawer and yet which is sufficiently collapsible (from a raised operating position) so that the drawer can be closed without ever removing the assembly.

Another object of the present invention is to provide a microfiche reader assembly which while remaining in the drawer can be moved between its raised operating position and its collapsed position in an uncomplicated and yet rapid and reliable manner.

Still another object of the present invention is to provide a microfiche reader assembly which requires minimum manipulation by the operator for movement between its extreme raised and collapsed positions.

Yet another object of the present invention is to minimize the amount of lateral space required by the microfiche reader assembly by moving the assembly vertically between its extreme operating and collapsed positions.

Still another object of the present invention is to provide a microfiche reader assembly having lateral stability while in the raised or reading position.

A further object of the present invention is to provide a microfiche reader assembly of the type described which can be rapidly and reliably installed into a desk drawer in an uncomplicated way.

Still a further object of the present invention is to provide a microfiche reader assembly which can be readily installed in either a lefthand drawer or a righthand drawer.

Still another object of the present invention is to provide a microfiche reader which although stored in a desk, makes use of the widely used commercially available double glass platten x-y fiche carriage.

Still another object of the present invention is to provide a dust and damage prevention cover or lid for the microfiche reader screen while the reader is in a stored condition.

Yet another object of the present invention is to provide a microfiche reader design in which the voltage to the reader is greatly reduced outside of the desk by an external transformer, thus ensuring freedom from the hazards of electronic shock within the desk drawer, especially in the case of metal desks.

As will be seen, the microfiche reader assembly disclosed herein is one which is especially suitable for use in a desk drawer having a horizontal base, opposite upstanding side panels, and upstanding front and back panels, specifically a drawer of approximately the standard size referred to above. This assembly includes a housing, a projection screen, a microfiche support arrangement having microfiche support means moveable within the confines of a given rectangular operating area, and an optical arrangement cooperating with a supported microfiche for projecting an enlarged image of a section of the microfiche on to the screen.

In accordance with the present invention, the microfiche reader assembly also includes means positionable entirely within the desk drawer on its base and supporting the assembly housing for movement between a first retracted position when not in use and a second extended, operating position. When the housing is in its retracted position, the housing lies entirely within the confines of the drawer a fixed distance above the base of the latter so that the projection screen, microfiche support arrangement and optical arrangement are also positionable entirely within the confines of the drawer in order that the latter may be easily closed. When the drawer is open and when the housing is in its extended position, the operating area of planar movement of the microfiche supporting means extends over an adjacent one of the drawer panels beyond the latter, whereby the supported microfiche is moveable outside the drawer while remaining in its operating area. In this way, the microfiche reader assembly does not have to be removed during use even though when in use it requires more room than the open drawer allots. At the same time, the assembly can be collapsed and easily stored entirely within the confines of the drawer when not in use.

The specific way in which the microfiche reader assembly is supported between its raised position when in use and its collapsed position when not in use in accordance with a preferred embodiment will be described in detail hereinafter along with other structural aspects of the assembly necessary to attain the previously recited objects. This detailed description and a description of a number of embodiments will be provided in conjunction with the drawings wherein:

FIG. 1 is a perspective view of a desk having an open drawer containing a microfiche reader assembly which is designed in accordance with the present invention and which is completely installed and ready for use;

FIG. 3 is a view similar to FIG. 2 but showing the microfiche reader assembly in a raised, operating position;

FIG. 4 is a perspective view of the microfiche reader assembly in its raised, operative position but illustrated so that some of the internal components of the assembly can be readily seen;

FIG. 5 is an enlarged, perspective view inside the assembly of FIG. 4, particularly illustrating lateral stabilizing bars utilized therein;

FIG. 6 is a perspective view of a portion of the microfiche reader assembly illustrated in FIG. 4, specifically showing a projection screen comprising part of the assembly and the way in which the screen is installed into and removed from the rest of the assembly;

FIG. 7 is a side elevational view of the microfiche reader assembly when the latter is in its raised, operating position;

FIG. 8 is a view similar to FIG. 7 but showing the microfiche reader assembly in its collapsed, inoperative position;

FIG. 9 is a perspective view of a microfiche reader assembly designed in accordance with a second embodiment of the present invention and shown in its raised, operative position;

FIG. 10a is a side elevational view of the microfiche reader assembly of FIG. 9;

FIG. 10b is a side elevational view of the microfiche reader assembly similar to FIG. 10a but showing the latter in its collapsed, inoperative position;

FIG. 11a is a side elevational view of a linking mechanism used in moving the microfiche reader assembly of FIGS. 10a and 10b between its raised and collapsed position, the linking mechanism being shown in its raised position;

FIG. 11b is a side elevational view of the linking mechanism of FIG. 11a but shown in its collapsed position;

FIG. 12 is a side elevational view of a microfiche reader assembly designed in accordance with still another embodiment of the present invention and shown in its raised, operative position; and FIG. 13 is a side elevational view of the assembly of FIG. 12 showing the assembly in its collapsed, inoperative position.

Figure 1A:
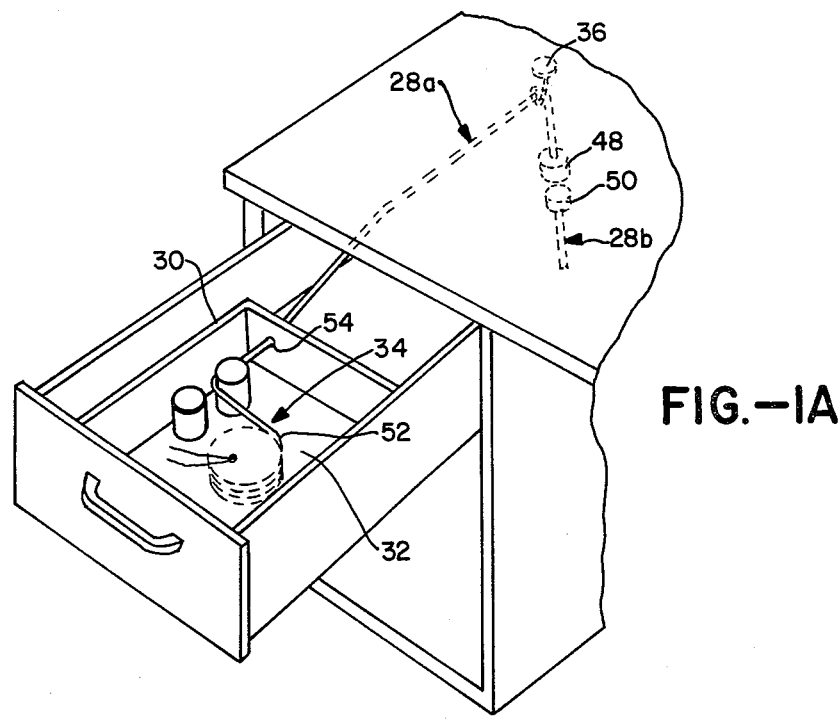
FIG. 1A is a perspective view of the open drawer of FIG. 1 particularly illustrating a detail of the microfiche reader assembly located therein.

Turning now to the drawings, wherein like components are designated by like reference numerals throughout the various figures, attention is first directed to FIG. 1. As seen in this figure, an office desk generally indicated by the reference number 10 is shown having a number of drawers including an opened drawer 12 located at the top lefthand side of the desk, as viewed from the front. This drawer is preferably of the standard size referred to above and includes a horizontal base 14, opposite upstanding side panels 16 and 18 and upstanding front and back panels, 20 and 22, respectively. The drawer is supported in a conventional way, for example by track means (not shown), for movement between the opened position shown and a closed position entirely within an associated drawer well 24. In this regard, the other drawers within the same well have been removed for purposes of clarity.

FIG. 1 also illustrates a microfiche reader assembly 26 which has been designed specifically for use within drawer 12 when the latter is open while at the same time being readily storable within the drawer when the latter is closed. To this end, as will be seen hereinafter, assembly 12 is readily maintained in either a collapsed, inoperative position sufficient to maintain it entirely within the confines of drawer 12 or a raised, operating position extending beyond the confines of the drawer when the latter is open. The assembly is shown in FIG. 1 in its collapsed position so that the drawer can be closed. In this regard, it is to be noted that the microfiche reader assembly includes an electrical power cord which will be discussed hereinafter. It should be obvious that a segment of this cord is located entirely outside drawer 12 whether the latter is opened or closed. Therefore, it is not absolutely correct to say that the entire microfiche reader assembly is contained within the confines of the drawer when the assembly is in its collapsed position since the cord may be considered part of the assembly. However, it is to be understood that the cord would be excepted from this statement. It is also to be noted that a small amount of space may exist between the top edges of side panels 16, 18 and the structure above the drawer under consideration, for example, another drawer within the well 24 or the top of the well. Such a space is shown best in FIG. 2 at 27. As a result, the assembly may be designed with this space in mind, that is, so that the assembly extends into and uses this extra space when in a collapsed position without preventing the drawer from being closed. Therefore, it is to be understood that this space is to be considered part of the confines of the drawer for purposes of the present invention.

Referring to FIG. 1a, assembly 26 is shown in open drawer 12 with all of its components absent except for a power cord generally indicated at 28 (see FIG. 1), a main housing 30, a support plate 32 (if one is used) and a reel mechanism 34 supported on plate 32. As will be seen below, the reel mechanism serves to take up the slack in a section of cord 28 as drawer 12 is moved between its opened and closed positions. In this regard, attention is redirected to FIG. 1 where cord 28 is shown in its installed position. Note that the cord extends from one lateral side of housing 30 up over the top of back drawer panel 22 and along the top of drawer well 24 to its back end. A hook 36 is fixedly mounted to an inside surface of the desk within well 24 at its top back end. This hook serves to fixedly retain in place a point along the length of cord 28, thereby dividing the latter into a forwardmost section 28a and a rearward section 28b. This latter section extends vertically downward at the back end of well 24 and extends through an opening 38 extending through the bottom panel of the well. An opening of this type is usually provided in most desks but if not it can be readily provided by means of a drill or the like. In a preferred embodiment, a grommet 40 is maintained within hole 38 for receiving cord section 28b and preventing the latter from being frayed, especially if the desk is constructed of metal. As seen in FIG. 1, cord section 28b extends out from the desk for connection to a transformer 44 which may be plugged directly into an outlet 46, or which may lie on the floor adjacent the outlet.

As will be seen, microfiche reader assembly 26 may incorporate all of the features of the present invention (to be described) while, at the same time, operating on readily available household current, e.g., 110 vac. However, in a preferred embodiment, the assembly utilizes an optical arrangement capable of operating on 12 volts while consuming 18 watts of power. As a result, transformer 44, which is used to make this reduction, may be plugged directly into outlet 46 away from the reader assembly itself and still be within UL (Underwriters Laboratory) standards. In this way, there is no more than 12 volts or 18 watts of power within drawer 12 as a result of assembly 26 and, hence, there is no danger to the user, even if the desk were steel and the assembly were inadvertently grounded to the desk or if the assembly for some reason remained on within a closed drawer and heated up.

Returning to FIG. 1A, it can be seen that the free end of cord section 28a includes plug 48. This plug is engageable into a receptacle 50 forming one free end of a separate cord section 52 (corresponding to cord section 28a in FIG. 1) wound around reel mechanism 34. While not shown, the other end of cord section 52 electrically connects to a projection lamp comprising part of the assembly's optical arrangement to be discussed hereinafter. Cord section 52 extends through a cooperating opening 54 in the rearward lateral side of housing 30 for engagement with plug 48. In this way when the drawer is in its opened position, cord section 52 is drawn entirely out of the reel, as illustrated and when the drawer is closed, cord section 52 is drawn in to its reel eliminating any slack in the overall cord section 28.

It is to be understood that the reel mechanism 34 and cord 28 including its various sections are not the only means of connecting the assembly to a source of power. The cord 28 could be connected directly into the assembly housing through hole 54. However, when using a single cord without the reel mechanism, it is preferred that the cord be separated into two sections, an outer section, including a plug and an inner section provided within housing 30 and extending between a receptacle at hole 54 and the assembly lamp. In this way, the plug can be readily inserted into the cooperating receptacle. Moreover, a second receptacle could be provided on the other lateral side of the housing and also interconnected with the lamp by a suitable cord section so that if the overall assembly is located in a righthand drawer a receptacle will be readily available without winding the outer cord section around to the front of the drawer. This could also be accomplished utilizing reel mechanism 34 by providing through holes (corresponding to hole 54) on both lateral sides of housing 30 and then by installing cord section 52 including its receptacle through the appropriate hole.

Figure 2:
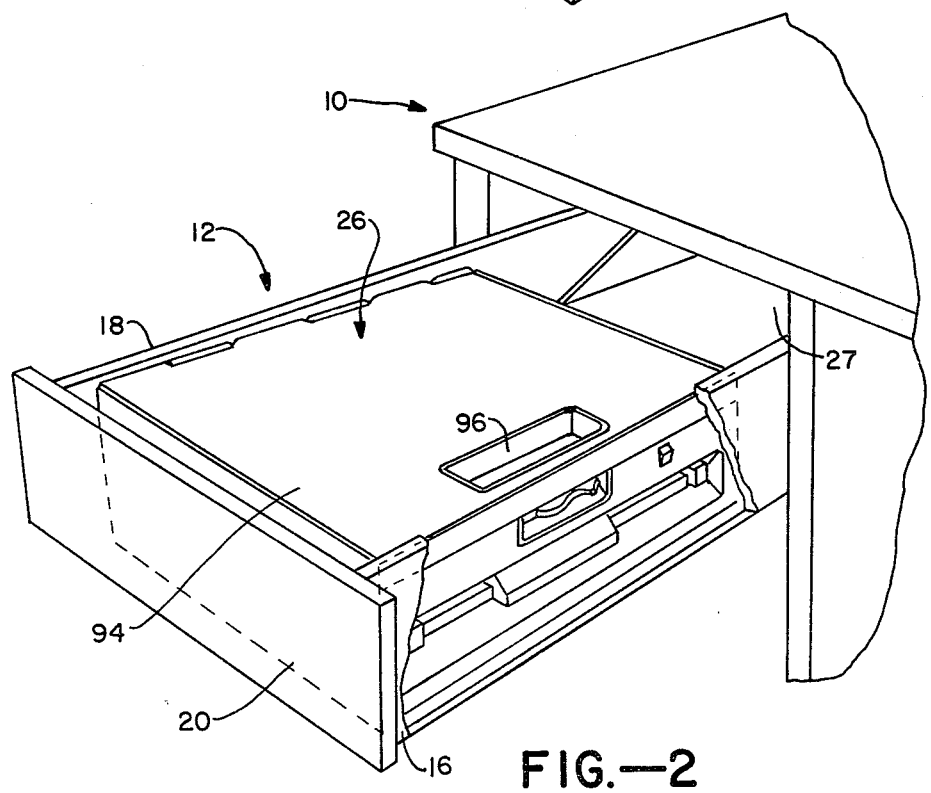
FIG. 2 is an enlarged broken away perspective view of the open drawer and the reader assembly of FIG. 1 shown in a collapsed, inoperative position.

Turning now to the structural details of microfiche reader assembly 26, attention is first directed to FIGS. 2 to 4 which illustrate the assembly in a closed or collapsed inoperative position (FIG. 2) and an opened or raised operative position (FIGS. 3 and 4). As will be seen hereinafter, the assembly utilizes a number of components interconnected to one another so as to allow it to fit entirely within the confines of drawer 12 when closed and to expand outside the drawer when in use. These components include the previously mentioned housing 30 which, as seen best in FIG. 4, has a rectangular periphery made up of vertically extending front and back sides 56 and 58, respectively, and opposite, vertically extending lateral sides, 60 and 62, respectively. In a preferred embodiment, the top and bottom ends of the housing are opened.

A projection screen support frame generally indicated at 64 in FIG. 4 comprises part of overall microfiche reader assembly 26 and includes a pair of vertically extending lateral panels 66 located on either side of a 90° rectangular frame section 68 and a front vertical panel 70. As best seen in FIG. 6, frame section 68 defines a central opening 72 between a pair of laterally spaced screen receiving flanges 74 extending along the entire height of the opening. The overall frame also defines an upper track or channeled opening 76 and a bottom track or channeled opening 78, both of which extend entirely across opening 72 from one flange 74 to the other. For reasons to be discussed below, track 76 includes a pair of leaf springs 80 mounted therein for downward urging toward track 78.

Overall support frame 64 serves to contain a microfiche reader projection screen 82 which is illustrated by dotted lines in FIG. 6. As seen there, the projection screen is readily disengageably retained by the support frame across opening 72 by first inserting the top horizontally extending edge of the screen into track 76 and against leaf springs 80. Once this is done, the bottom horizontally extending edge of the screen can be fitted into track 78. The vertically extending side edges of the screen merely sit on side flanges 74. By designing the overall support frame and screen in this way, the latter can be readily and rapidly removed so as to clean its underside if necessary, and also in order to gain access into housing 30 for purposes of maintenance.

Returning to FIG. 4, it can be seen that the two lateral panels 66 of frame 64 are pivotally connected by suitable pivot pins or the like indicated at 84 to lateral sides 60 and 62 of housing 30 near the top front ends of the lateral sides. With the overall support frame pivotally mounted to housing 30 in this manner, the frame and its projection screen are moveable between the raised operative position shown in FIGS. 3 and 4 and a collapsed, inoperative position. When the frame is in its raised position, the projection screen extends upwardly and rearwardly from the front side 56 of housing 30 at an incline with the horizontal. In a preferred embodiment, this incline is between 30° and 90° with the horizontal and preferably 50°. When the assembly is in its collapsed, inoperative position, the lateral panels 66 and front panel 70 lie within the confines of housing 30 and projection screen 82 extends substantially horizontally across the top opened end of the housing. A pair of spring members 86 (best seen in FIG. 6) are connected between lateral panels 66 and the inside surface of housing panel 56 above pivot points 84. In this way, the spring members bias the support frame and its associated projection screen in the raised, operative position of FIGS. 3 and 4.

Microfiche reader assembly 26 also includes a cover lid 88 having opposite, vertically extended lateral side panels 90, a vertically extending front panel 92 extending entirely across and between the front ends of side panels and a closed top side 94 which is best seen in FIG. 2. As is also seen in this latter figure, a handle 96 is provided in top side 94 near the front end of the latter. Note that the vertical side panels 90 cooperate with the lateral panels 66 of projection screen support frame 64 when the two are in their FIG. 4 position to prevent ambient light from entering housing 30 above lateral sides 60 and 62 thereof.

The top side 94 of lid 88 is pivotally connected along its back edge to the uppermost edge of back housing panel 58 utilizing suitable pivot connecting means generally indicated at 98. The lid pivotally mounted in this manner is moveable between an opened, operative position extending up from the backside of housing 30 and a closed, inoperative position such that the top side 94 extends substantially horizontally across the top end of the housing. It should be apparent from FIGS. 3 and 4 that lid 88 must be opened before the projection screen 82 can move to its extended position and that the screen must be moved back to its collapsed position before the lid can be closed again. In fact, in the embodiment illustrated in FIG. 4, when the lid is moved from its closed position to its opened position, spring members 86 automatically cause the support frame 64 and projection screen 82 to move from the collapsed position to the raised position such that the top of frame section 68 rests against the underside of topside 94 of the lid 88 behind handle 96.

In a preferred embodiment, a pair of spring members 100 are connected from side panels 90 of lid 88 or from the rearmost portion of link 138, soon to be described, to the inside surface of front housing panel 56 in order to bias the lid in two different ways. More specifically, when the lid is in the opened position shown in FIG. 4, the lid connected ends of springs 100 are located above a certain critical plane which is approximately horizontal and approximately through hinge point 98 (between the lid and housing). Auxiliary springs 100a connected from the rearward ends of springs 100 (at side panels 90 or links 138) to the bottom rearward corners of the housing insure the positive return of lid 88 to its operating position. As a result, these springs bias (urge) the lid towards its closed position, that is against the top of frame section 68. The lid connected ends of the springs are positioned in this manner throughout movement of the lid from its extreme raised position to a critical intermediate point closer to its extreme closed position. As the lid moves downwards past this intermediate point, the lid connected ends of the springs move below the previously mentioned critical plane. This, in turn, causes the springs to bias or urge the lid towards its opened position, thereby aiding the operator in initially pulling the lid open from its closed position, at least until the lid reaches the intermediate point. As a result, it is easier for the operator to move the overall assembly from its collapsed, inoperative position to an extended operating position.

Referring to FIG. 4 in conjunction with FIG. 7, overall microfiche reader assembly 26 is shown including a microfiche support arrangement generally indicated by the reference numeral 102. This arrangement may be of a conventional type connected with and supported by housing 30 and including a carriage mechanism supporting the microfiche within a fixed plane. This carriage mechanism is moveable within the confines of a given rectangular operating area so that different sections of the microfiche can be moved to a particular optical point within the overall operating area. From FIGS. 4 and 7, it should be apparent that this operating area extends on either side of front panel 56 of housing 30 so as to provide a sub-area inside the housing and a sub-area outside the latter. To this end, front housing panel 56 includes a horizontally extending through slot 104 (FIG. 4).

In a preferred embodiment, microfiche support arrangement 102 includes a pair of fixed horizontal tracks 103 (only one being shown in FIG. 4) mounted inside housing 30 and connected between front panel 56 and back panel 58. The arrangement also includes a moveable carriage 106 mounted on the fixed tracks for rearward and forward movement across the operating area between an extreme rearward position entirely within the confines of the housing and extreme forward position partially outside the housing. The carriage 106 includes means 107 which are moveable within tracks 103 and which carry a sub-carriage 108 including means 109 containing a given microfiche supported in a horizontal position and cross tracks 111. The microfiche containing means 109 is mounted for lateral movement on the cross tracks. In this way the microfiche is moveable to any point in the overall operating area. In a preferred embodiment, the fixed tracks 103 are substantially identical to the fixed tracks comprising part of the microfiche carriage arrangement illustrated in FIGS. 5 and 6 in copending U.S. patent application, Ser. No. 127,127 filed Mar. 4, 1980 now U.S. Pat. No. 4,320,943 entitled CARRIAGE SUPPORT ARRANGEMENT FOR A MICROFICHE READER which application has been assigned to the assignee of the present application. In addition, the carriage 106 and sub-carriage 104 are preferably substantially identical to the carriage and sub-carriage illustrated in FIGS. 2 to 5 of the patent application just recited and therefore reference is made thereto. The main differences between the overall carriage utilized with arrangement 102 and the carriage illustrated in the recited application resides in the utilization of the present arrangement in a desk drawer reader as opposed to a desk top reader of the type illustrated in FIG. 1 of the copending application. In the present embodiment, a portion of the carriage 106 and sub-carriage 108 are capable of moving forward beyond the fixed tracks 103 and outside the housing whereas in the embodiments illustrated in FIGS. 2 to 6 of the recited application, a front support plate or bar limits forward movement of the carriage and sub-carriage to the forward ends of the fixed tracks. Because this is not the case with respect to arrangement 102, a stop member, for example, a raised protrusion (not shown) may be provided on either the carriage or the fixed tracks for preventing the carriage and sub-carriage from being pulled entirely out of the fixed tracks unless this is specifically desired. In this latter case, the carriage could be tilted slightly around the stop member to provide complete removal.

As illustrated best in FIG. 7, the overall operating plane of microfiche support arrangement 102 extends at a slight incline with the horizontal forwardly and upwardly from the rearwardmost edge of the operating area to its forwardmost edge. In an actual embodiment, the angle of this plane with the horizontal is approximately 10° although the present invention is not limited to this angle. As a result of this incline, there is a tendency for the carriage 106 and its sub-carriage 108 to slide back into the housing after it has been pulled out. Accordingly, a pair of compensation springs 110 are connected from cooperating tabs 112 fixedly connected at the back end of carriage 106 to the inside surface of front housing panel 56. The fixed tabs 112 are located on opposite lateral sides of the carriage and move with the latter between its extreme rearward and forward position. The springs expand when the carriage is in its extreme inner position and relax when the carriage is in its extreme outer position, thereby compensating for the gravitational pull resulting from the incline. Thus, as the carriage is pulled out, the springs prevent the latter from sliding back into the housing while, at the same time, allowing the carriage to be readily inserted into the housing and remain there until it is pulled out again.

In addition to the various components thus far described, overall microfiche reader assembly 26 includes an optical arrangement 114 which is best illustrated in FIG. 7. The purpose of this arrangement is to cooperate with a supported microfiche for projecting an enlarged image of a section of the microfiche onto the projection screen when the latter is in its raised, operating position and the supported microfiche is in the operating area defined by the overall microfiche support arrangement 102. As seen in FIG. 7, optical arrangement 114 includes a condenser lens 116, a projection lens 118 and two mirrors, a small mirror 120 and a larger mirror 122. While not shown, the optical arrangement also includes a projection lamp optically aligned so as to illuminate the condenser lens 116 and electrically connected with cord 28 in the manner described with respect to FIGS. 1 and 2 previously. The optical arrangement may be readily provided by those with ordinary skill in the art using a conventional condenser, a conventional projection lens and a readily provided arrangement of mirrors in order to project an appropriate microfiche segment on to screen 82. Therefore, these components are only illustrated diagrammatically in FIG. 7 and not shown actually physically supported to and within the housing 30. To the extent shown, it should be apparent that the condenser lens is located in a fixed location directly below the microfiche support arrangement in a central location with respect to its operating area. The projection lens 118 is located in optical alignment vertically above the condenser lens and below the small mirror 120, all of which are located near the front of the housing. The small mirror 120 is held in place by a backing support 120a connected to front panel 5b of housing 30 by an extension arm 120b (FIG. 7). The extension arm supports the mirror and its backing support for flexing movement between the blank biased operating position shown in FIG. 7 and a downwardly flexed position caused by and to make room for the projection screen when the latter is moved down to its retracted position. The large mirror 122 is located at the back end of the housing. These components are optically interconnected so that the light beam from the projection lamp extends upward as indicated at B1 through the condenser lens, through a segment of the supported microfiche located above the condenser-lens, through the projection lens and finally onto the small mirror. The small mirror reflects the beam rearwardly as indicated at B2 to the large mirror 122 which reflects the beam toward the screen, as indicated at B3.

In a preferred embodiment, optical arrangement 114 includes a dual projection lens/dual condenser lens arrangement of the type described in co-pending U.S. patent application Ser. No. 127,230 filed Mar. 4, 1980 and entitled LENS ARRANGEMENT FOR MICROFICHE READER ASSEMBLY AND METHOD, which application is assigned to the assignee of the present application. For purposes of expediency and clarity, a detailed description of this dual assembly will not be discussed herein and therefore reference is made to the last-recited co-pending application. It should suffice to say that the dual assembly utilizes two projecton lenses, alternatively, in order to project a section of the microfiche on to the screen at two different magnification levels. In order to accomplish this, two different condenser lens means are used with and interlocked to the projection lenses for movement therewith. A selector arm is provided for alternatively switching between the projection lenses. For purposes of illustration such an arm is shown in FIGS. 2, 3 and 4 at 124 and extending through front housing panel 56.

With respect to optical arrangement 114, the optical positioning between the condenser lens and the projection lens (whether they are conventional or of the dual assembly type described above) are preferably located in predetermined positions relative to one another. Specifically, in a preferred embodiment, the two are located as described in co-pending U.S. patent application Ser. No. 127,228 filed Mar. 4, 1980 and entitled OPTICAL ARRANGEMENT FOR USE IN A MICROFICHE READER AND METHOD. For purposes of expedience and clarity, a detailed description of this positioning will not be discussed herein and therefore reference is made to the last recited copending application. It suffices to say that the projection lens 118 is located on beam path section B1 such that there is a predetermined spacing between the projection lens and the condenser lens. As described in the last-recited co-pending application, this spacing is selected to increase and preferably maximize illumination efficiency of the overall optical arrangement. This, in turn, allows the overall microfiche reader assembly to operate on the relatively low power of 18 watts as discussed previously.

Referring to FIG. 4 in conjunction with FIGS. 7 and 8, an overall arrangement 130 for supporting housing 30 is illustrated. This support arrangement which also comprises part of the overall microfiche reader assembly is itself adapted for positioning entirely within drawer 12 on the base on the latter and supports the housing for movement between a first retracted position and a second extended position. As will be seen hereinafter, when the housing is in its retracted position and the projection screen and lid are in their collapsed and closed, inoperative positions, respectively, and when microfiche support arrangement 102 is contained entirely within the housing, all of these components as well as the optical arrangement fit within the confines of drawer 12 as best illustrated in FIG. 2. From this latter figure it should be obvious that the operating plane of movement of the microfiche carriage 106 and subcarriage 108 is located below the lip or top edge of its adjacent drawer panel 16 when the overall assembly is positioned in the drawer in the manner shown.

When housing 30 is moved to its extended position, with drawer 12 opened of course, the operating plane of the microfiche support arrangement moves above the lip or top edge of the adjacent drawer panel and, in operation, actually extends over the top edge and laterally beyond the drawer panel outside the drawer (See FIG. 7). In this way, the microfiche is actually supported for lateral movement within and outside the drawer. At the same time, the projection screen and lid are maintained in their raised and opened operating positions. In fact, as will be seen hereinafter, in a preferred embodiment, the lid 88 is interlocked with support arrangement 130 and housing 30 such that movement of the lid from its closed position to its opened position by the operator automatically causes the housing to move from its retracted inoperative position to its raised operating position and movement of the lid from its open position to its closed position automatically causes the housing to move from its extended position to its retracted position.

Overall housing support arrangement 130 includes a horizontally extending base plate 132 which is adapted for mounting to and against the top of base 14 in drawer 12, for example by means of adhesive. Arrangement 130 also includes a pair of housing support mechanisms 134, one of which is shown in FIGS. 4, 7 and 8. As seen in these figures, the support mechanism illustrated there includes a pair of elongated links 136 and 138 which are pivotally connected to one another like a scissors at an intermediate point on each by suitable pivot connecting means 140. The rearward end of link 136 is pivotally connected to the back left hand end of base plate 132 (as viewed in FIG. 4) by a raised tap 142 fixed to and comprising part of the base plate and suitable pivot connecting means 144. The forwardmost end of the same link is pivotally connected to the inside surface of the housing side panel 62 at a bottom forward point by suitable pivot connecting means 146. The top rearwardmost end of link 138 is pivotally connected to the lefthand panel 90 of lid 88 at a rearward bottom point of the latter by suitable pivot connecting means 148. The bottom forwardmost end of link 138 is mounted for limited horizontal movement along a slot 150 within a vertical tab 152 fixedly connected with and comprising part of base plate 132 at the lefthand, forward end of the latter, as best seen in FIGS. 7 and 8. Movement connecting means, for example, a slidable connecting pin 154, is utilized to this end.

The other housing support mechanism is identical to the one described and interconnects housing 30 with lid 88 and base plate 132 in the same manner. However, for purposes of clarity so as not to obstruct the view of other components, especially with respect to FIG. 4, the second mechanism is not shown. This latter mechanism is however, located on the righthand side of the housing in lateral alignment with the support mechanism illustrated and connected with corresponding components.

In operation, the two support mechanisms move like scissors between the extended or raised position shown in FIGS. 4 and 7 and the collapsed position shown in FIG. 8. Note that as the mechanism collapses, the rearward end of each link 136 rotates as indicated by the arrow in FIG. 7 while its forwardmost end moves downward. At the same time, the top rearward end of each link 138 moves downward and rearward while its front lowermost end moves forward, as also indicated by the arrows. As the links move to their extended position from their collapsed positions, these movements of their ends are reversed in direction.

In view of the foregoing, it should be apparent that movement of lid 88 from its closed position to its open position causes the support mechanisms to move from their collapsed positions to their extended positions which, in turn, automatically causes the housing to move upward from its retracted position to its raised position. As this occurs, the screen automatically moves up to its raised position. Thus, an operator needs merely to raise the lid using one hand from its closed position to its raised position in order to place the entire assembly in a raised operating state. In this regard, the spring members 100 described previously aid the operator in these manipulative procedures. In order to collapse the entire assembly, it is necessary to first lower the projection screen so that the lid can be moved from its opened position to its closed position, thereby automatically moving the housing down to its collapsed position.

It should be apparent from the foregoing, that the movement of housing 30 and its associated components between the collapsed and raised positions allows the assembly to be located entirely within drawer 12 when collapsed so that the drawer can be closed. At the same time, this movement allows the assembly to be placed in use while remaining in the drawer. The vertical movement of the housing is a result of the way in which it is supported by mechanisms 134. This means that no extra space other than that required by the outer periphery of the assembly is necessary in moving the assembly between its collapsed and raised positions. This minimizes the amount of space necessary within drawer 12. Moreover, the way in which the housing, screen, lid and housing support arrangement are interconnected requires minimum manipulation by the operator in moving the assembly between its extreme positions.

As described above, overall support arrangement 130 supports housing 30 for vertical movement between its extreme retracted and extended position. In order to reduce lateral movement of the housing and to control a tendency of the housing 30 to rock, assembly 26 includes stabilizing bars 156 and 157 which are best illustrated in FIGS. 4 and 5. As seen there, these bars are pivotally connected at one end to the top of vertical tabs 158 and 159 by means of suitable pivot pins or the like 160 and 161. The hole in tab 158 for pin 160 is slightly slotted horizontally. The tabs are fixedly connected to and comprise part of base plate 132 at the rearward part of the latter, as viewed in FIG. 5. The other ends of stabilizing bars 156 and 157 are pivotally connected to the inner surface of backside panel 58 of housing 30 near the outer ends of the latter, again as viewed in FIG. 5, by means of suitable pivot pins or the like 162 and 163. The hole for pin 162 is slightly slotted horizontally. As illustrated in FIG. 5, as housing 30 moves between its extreme retracted and extended positions, the stabilizing bars pivot in a scissors fashion between a downwardly inclined position and an upwardly inclined position (with respect to tabs 158 and 159) causing a very slight lateral pull of the housing toward the right when the housing is in its mid position between its extremes. This maintains the housing relatively secure laterally and prevents rocking even though it is opened at its top end and its bottom end. The slight rightward movement of the housing causes the pins 162 and 160 to move very slightly in their slotted holes.

Overall microfiche reader assembly 26 can be stored or used in drawer 12 as described above. The exact dimensions of the components making up this assembly may of course vary. However, in an actual working embodiment, housing 30, which defines the outermost periphery of the assembly, (with the exception of height) is 14.5 inches wide from side to side, 11.8 inches deep from front to back and 4.3 inches high from top to bottom. With lid 88 closed, the very top of the assembly is 4.4 inches from base plate 132 which means that the entire assembly extends this amount above the base or bottom of drawer 12. In this actual embodiment, arrangement 130 supports the housing and its connected components for a total vertical movement of about 3.1 inches which means that the microfiche support plane moves the same amount.

Having described microfiche reader assembly 26, its manner of operation and an actual working embodiment from at least the standpoint of dimensions, attention is now directed to FIGS. 9 to 11 for a description of a microfiche reader assembly constructed in accordance with a second embodiment of the present invention. This second assembly is generally designated by the reference number 164 in FIG. 9. As will be seen below, this latter assembly includes a housing which is similar in most respects to previously described housing 30, an entirely different lid and projection screen and an entirely different means for raising and lowering the housing. However, the microfiche support arrangement comprising part of assembly 164 which is partially shown in FIG. 9 and its optical arrangement which is not shown at all may be identical to microfiche support arrangement 102 and optical arrangement 114 comprising part of overall assembly 26.

Referring to FIG. 9 in conjunction with FIGS. 10A and 10B, assembly 164 is shown including a rectangular housing 166 including front and back sides or panels 168 and 170, respectively, and opposite lateral or side panels 172 and 174. A horizontally extending slot 176 is provided across front side 168 for accommodating microfiche support arrangement 102. While not shown, the front side may also include the lens selection handle 124 (see FIG. 4) associated with the preferred dual projection lens/dual condenser lens assembly comprising part of optical arrangement 114 in the event assembly 164 utilizes such an arrangement. Moreover, like housing 30, housing 166 is preferably opened at its top end and at its bottom end.

With particular reference to FIG. 9, it can be seen that overall microfiche reader assemlby 164 includes a combination lid/projection screen arrangement generally designated by the reference number 178. This combination arrangement includes an overall frame consisting of vertical side panels 180 and 181, a somewhat vertical front panel 182, a vertical back panel 184 and a 90° frame section 186. The frame section 186 defines a rectangular opening across which a projection screen 188 extends. While not shown, frame section 186 is preferably provided with the upper and lower tracks 76 and 78 and the lateral flanges 74 comprising part of the projection screen support frame 64 of assembly 26 described previously with respect to FIG. 6. In this way, projection screen 188 can be readily disengageably maintained within the opening defined by frame 186.

As seen in FIG. 9 in conjunction with FIGS. 10A and 10B, the front ends of the side panels 180 and 181 of lid 178 are respectively pivotally connected to the lateral sides 172 and 174 of housing 166 at points adjacent front panel 168 outside the housing. Suitable pivot connecting means 190 (FIG. 9) and 192 (FIGS. 10A and 10B) are utilized to this end. The lid connected to the housing in this manner is pivotally moveable between the raised operating position illustrated in FIGS. 9 and 10A and a lowered or retracted inoperative position illustrated in FIG. 10B. With the lid in its raised operating position, projection screen 188 extends upwardly and rearwardly from the front side of housing 166 at an incline with the horizontal, preferably between 30° and 90° with the horizontal. In an actual working embodiment, the projection screen extends at an angle of 32° to the horizontal when the screen is in its raised operating position. With the lid in its lowered or retracted inoperative position, projection screen 188 extends substantially horizontally across the top opened end of housing 166.

It should be apparent from FIGS. 9 and 10A that there is a relatively large space between the bottom rearward edge of lid 178 and the top rearward edge of housing 166 when the lid is in its raised position. Unless this spacing is closed, light from the ambient surroundings would pass therein and impinge upon the back side of projection screen 188, thereby significantly reducing image contrast across the latter as viewed from its front side. As a result, microfiche reader assembly 164 includes a rear skirt 194 having opposite side panels 196 (FIG. 9) and 198 (FIG. 10A) and a back panel 200. The forwardmost ends of side panels 196 and 198 are connected for free pivotal movement to pivot connecting means 190 and 192, respectively, between housing 166 and lid 178, as best seen in FIG. 9.

With skirt 194 mounted in the manner described, the latter is movable between a collapsed or lowered position in lateral alignment with housing 166 between the latter and lid 178 when the lid is in its retracted position and the raised position illustrated in FIGS. 9 and 10a. When the skirt is in its raised position, its side panels and back panel together extend between and close the spacing between the housing and lid when the latter is in its raised position. The lid is movable between these extreme positions by interlocking it for movement with the lid. In order to accomplish this, the lid includes a pair of stops 202 (FIG. 9) and 204 (FIG. 10a) projecting inwardly from side panels 180 and 181 at the bottom front end of the latter. These stops engage under the bottom edges of side panels 196 and 198 of the skirt so as to carry the latter between its extreme retracted and extended positions as the lid is moved between its extreme retracted or closed and extended or opened positions.

In addition to the various components thus far described, overall microfiche reader assembly 164 includes an arrangement 206 for supporting housing 166 for pivotal movement between a lowered inoperative position and a raise operative position. The reason for this movement is the same as described previously with respect to housing 30, that is, so that the entire assembly can fit within the confines of previously described drawer 12 when not in use or move to an operative position within the drawer when the latter is open.

Overall support arrangement 206 includes a horizontally extending base plate 208 adapted for mounting to the base of drawer 12, the latter being indicated by dotted lines in FIGS. 10A and 10B. Arrangement 206 also includes a pair of support arms 210 (FIG. 9) and 212 (FIG. 10a) fixedly connected to base plate 208 on opposite lateral sides of the base plate and extending upwardly and rearwardly therefrom. The top ends of these arms are pivotally connected to top rearward points on the lateral sides 172 and 174 of housing 166 so that the housing is pivotally moveable between the extreme positions described above. Suitable pivot connecting means indicated at 214 and 216 in FIGS. 9 and 10A are utilized to this end.

Arrangement 206 also includes a pair of mechanisms 218 and 220 interconnecting housing 166, lid 178 and base plate 208 during movement of the housing between its extreme positions and for maintaining the housing in its raised position. Referring to FIGS. 11A and 11B, support mechanism 220 is shown by itself for purposes of clarity. As seen in these latter figures, the support mechanism includes three interconnecting links, a first elongated link 222, a second somewhat triangular-shaped link 224 and a third elongated link 226. The link 222 is pivotally connected at its top end to one corner of link 224 by a suitable pivot connecting means 228. The rearward end of link 226 is pivotally connected to a second corner of link 224 by a suitable pivot connecting means 230. Referring back to FIG. 10A, it can be seen that the bottom end of link 222 is pivotally connected to a vertical tab 232 fixedly connected with and comprising part of base plate 208 on one lateral side of the base plate near its front end. The forward otherwise unconnected end of link 226 is pivotally connected to the inside surface of side panel 181 at the front of the latter just below pivot connecting means 192 as best seen in FIG. 10A. Suitable pivot connecting means 236 is utilized to the end. Finally, the third corner of triangular-shaped link 224 is pivotally connected to the inside surface of housing side 174 near but not at the front of the housing and near the top edge of the latter. Suitable pivot connecting means 240 is utilized to this end.

Having described mechanism 220, attention is now directed to the way in which it operates during movement of housing 166 between its extreme collapsed and extended positions. As seen in FIG. 10A, housing 166 is in its extended position and lid 178 is opened. The housing and lid are maintained in this position by mechanism 220, as stated previously. More specifically, as seen in FIG. 11A, the two links 222 and 224 act as a "knee" connection in which the knee or pivot point 228 is located rearwardly of a vertical plane P through pivot point 234. Because the back end of the housing is maintained fixed (except for rotation) by support arms 210 and 212, the pivot point 228 will not move further rearwardly. On the other hand, because pivot point 228 is rearward of the vertical plane P just mentioned, the two links making up the knee lock in place preventing the housing from pivoting back downward in a forward direction. In order to lower the housing, the knee must be broken, that is, the pivot point 228 must be moved forward of the vertical plane. This is accomplished by lowering lid 178. In so doing, the pivot point 236 interconnecting side panel 181 of the lid with the forward end of link 226 moves forward and downwardly to a horizontal position against base plate 208. At the same time, the lid moves down over the housing automatically causing skirt 294 to move on stops 202 and 204 to an aligned position between the housing and lid. In order to return the housing to its extended position, this may be accomplished merely by moving the lid from its closed position to its raised open position. In moving the lid in this manner, pivot point 236 moves upward and rearwardly causing the links 222 and 224 to again lock into place.

While only support mechanism 220 has been described in detail, it is to be understood that the support mechanism 218 is identical in structure and operation. However, the support mechanism 218 is located on the opposite side of housing 166 in lateral alignment with mechanism 220, as best seen in FIG. 9. In this regard, the bottom end of the link 222 mechanism 218 is pivotally connected to a corresponding tab 232 laterally in line with the previously described tab. Triangular link 224 of mechanism 218 is pivotally connected to housing side 172 and link 226 is pivotally connected to lid panel 180.

In view of the foregoing, it should be apparent that housing 166 is moveable between its collapsed inoperative position and its raised operating position mereby by moving lid 178 between its closed and open positions. Moreover, this automatically moves the skirt 194 between its lowered and raised positions. It should also be apparent, particularly from FIG. 10A, that the entire assembly fits within the confines of drawer 12 when the housing can be pivoted upwards by opening the lid so that the entire assembly can be placed in use. In this way, the microfiche support arrangement 102 comprising part of assembly 164 is moveable between a lowered position below the top edge of an adjacent drawer panel and a raised position above the top edge of the latter. In the embodiment illustrated, the operating plane of movement of the supported microfiche extends at an angle of approximately 16° with the horizontal when its associated housing is in the raised position. In the same actual working embodiment, housing 166 is 14.5 inches wide from side to side, 12 inches deep from front to back and 4.7 inches from its bottom end to its top end. In this same embodiment, the front end pivots between its extreme positions approximately 2.5 inches.

Having described overall microfiche reader assembly 164, attention is briefly directed to still another microfiche reader assembly which is preferred over assembly 164 and which is generally designated by the reference numeral 250 in FIGS. 12 and 13. This latter assembly may be identical to previously described assembly 164 with the exception of housing support mechanisms 218 and 220 comprising part of this latter assembly. In other words, the housing, combination lid and projection screen arrangement and support arrangement of assembly 250 may be identical to the corresponding components of assembly 164 described above. Moreover, the microfiche support arrangement and optical arrangement of assembly 250 may be identical to the corresponding arrangements of assembly 64. Therefore, with the exception of the housing support mechanisms associated with assembly 250, this assembly has been shown only diagrammatically with many of its components omitted for purposes of convenience.

With specific reference to FIGS. 12 and 13, overall microfiche reader assembly 250 is shown including a housing support mechanism 252. This mechanism includes a single elongated link 254 pivotally connected at its bottom end to previously described vertical tab 232 connected with and comprising part of base plate 208. A suitable pivot connecting means 256 is utilized to this end. The otherwise free top end of link 254 is pivotally connected to side 181 of lid 178 by suitable pivot connecting means 258 at a point below the pivot connecting point 192 of the lid and housing. An identical support mechanism is located in lateral alignment with mechanism 252 on the opposite side of housing 166. The link associated with this second mechanism has its bottom side pivotally connected to the laterally aligned tab 152 (see FIG. 4) and the top end of the link is pivotally connected to the side panel 180 of the lid.

In operation, when lid 178 is in its opened position, the link 254 extends in such a way as to lock the link in place and maintain housing 166 and the lid in their operative positions in the same manner as described previously with respect to link mechanisms 218 and 220. In the embodiment shown, each link 254 is in its "locked" position when it is to the right of a plane p1 shown in FIG. 12. This plane extends approximately through the pins 192 and 256. In this regard, it is to be understood that the locking positions of the links 254 will vary depending upon the weight distribution on either side of plane p1. Movement of the lid from its open position to its closed position causes pivot point 258 at the top of link 256 to move forwardly and downwardly to the position illustrated in FIG. 13 so as to allow the housing to move downward to its collapsed position and to close lid 178.

We claim:
1. A microfiche reader assembly especially suitable for use in a desk drawer having a horizontal base, opposite upstanding side panels and upstanding front and back panels, said assembly comprising:
(a) a microfiche support arrangement including means for supporting a microfiche, said microfiche supporting means being movable within the confines of a given rectangular operating area;
(b) a projection screen;
(c) an optical arrangement cooperating with a supported microfiche for projecting an enlarged image of a section of said microfiche onto said screen when the supported microfiche is in said operating area;
(d) housing means for supporting said microfiche support arrangement, projection screen and optical arrangement relative to one another;
(e) housing support means adapted for positioning entirely within said drawer on the base of the latter and supporting said housing means for movement between
(i) a first retracted position entirely within the confines of said drawer a fixed distance above the base of the latter such that said microfiche sup- port arrangement, projection screen and optical arrangement are positionable entirely within confines of said drawer, whereby to close the latter, and (ii) a second extended position above said retracted position such that, when said drawer is open, the operating area of planar movement of said microfiche supporting means extends over an adjacent one of said drawer panels and beyond said adjacent one of said drawer panels and beyond said adjacent panel outside said drawer whereby the supported microfiche is movable outside said drawer while remaining in its operating area; and (f) a cover lid pivotally connected with said housing means on one side thereof for movement between a substantially horizontally extending closed position and an upwardly pivoted opened position, said cover lid being interconnected with said housing support means so as to cause the latter to move said housing means from its retracted position to its extended position when said lid is moved from its closed position to its opened position and to cause said housing support means to move said housing means from its extended position to its retracted position when said lid is moved from its opened position to its closed position.

2. An assembly according to claim 1 including:

(a) means separate from said cover lid and pivotally connected with said housing means on the opposite side of said lid for supporting said projection screen for movement between a first operative position at an incline with the horizontal when said cover lid is in its opened position and a second substantially horizontal, collapsed position before said lid is moved to its closed position; and (b) means connected with said housing means and said screen supporting means for biasing the projection screen in its operative position whereby movement of said lid from its closed position to its open position automatically causes said screen to move from its collapsed position to its operative inclined position.

3. An assembly according to claim 2 wherein said screen supporting means includes means for disengagably retaining said screen whereby the latter is readily removable for access into said housing means.

4. An assembly according to claim 2 wherein said screen is inclined between approximately 30° and 90° from the horizontal when the screen is in its operative inclined position.

5. An assembly according to claim 1 wherein said cover lid contains said projection screen such that the latter is substantially horizontal when said lid is in its closed position and at an incline with the horizontal when said lid is in its opened position.

6. An assembly according to claim 5 including a skirt means pivotally connected with said housing means and interlocked with said cover lid for movement between a substantially horizontal position with said lid when the latter is in its closed position and a raised, inclined position when said lid is in its opened position, said skirt means preventing light in the ambient surroundings from reaching the back of said projection screen.

7. An assembly according to claim 5 wherein said screen is inclined between approximately 30° and 90° from the horizontal when the screen is in its operative inclined position.

8. A microfiche reader assembly especially suitable for use in a desk drawer having a horizontal base, opposite upstanding side panels and upstanding front and back panels, said assembly comprising:

(a) housing means;

(b) a microfiche support arrangement supported within said housing means and including means for supporting a microfiche, said microfiche supporting means being movable within the confines of a given rectangular operating area;

(c) a projection screen supported within said housing means;

(d) an optical arrangement supporting within said housing means and cooperating with a supported microfiche for projecting an enlarged image of a section of said microfiche onto said screen when the supported microfiche is in said operating area, said optical arrangement including an electrically energized projector lamp, an electrical cord adapted for connection at one end to an electrical receptical and having a disengagable plug at its other end, and means accessible from opposite sides of said housing means for receiving said disengagable plug and electrically connecting the latter to said projector lamp;

(e) means for maintaining a first section of said cord in a fixed position within said desk behind said drawer, said cord including a second separate section including said disengagable plug; and (f) housing support means adapted for positioning entirely within said drawer on the base of the latter and supporting said housing means for movement between (i) a first retracted position entirely within the confines of said drawer a fixed distance above the base of the latter such that said microfiche support arrangement, projection screen and optical arrangement are positionable entirely within the confines of said drawer, whereby to close the latter, and (ii) a second extended position above said retracted position such that, when said drawer is open, the operating area of planar movement of said microfiche supporting means extends over an adjacent one of said drawer panels and beyond said adjacent panel outside said drawer whereby the supported microfiche is movable outside said drawer while remaining in its operating area.

9. An assembly according to claim 8 wherein said second section is equal to approximately one-half the length of movement of said drawer between its completely opened position and its closed position, said second section being maintained loosely within said drawer.

10. A microfiche reader assembly especially suitable for use in a desk drawer having a horizontal base, opposite upstanding side panels and upstanding front and back panels, said assembly comprising:

(a) a microfiche support arrangement including means for supporting a microfiche, said microfiche supporting means being movable within the confines of a given rectangular operating area;

(b) a projection screen;

(c) an optical arrangement cooperating with a supported microfiche for projecting an enlarged image of a section of said microfiche onto said screen when the supported microfiche is in said operating area;

(d) housing means for supporting said microfiche support arrangement, projection screen and optical arrangement relative to one another, said housing means including opposite lateral sides;

(e) housing support means including opposite lateral sides and adapted for positioning entirely within said drawer on the base of the latter and supporting said housing means for substantially vertical movement between (i) a first retracted position entirely within the confines of said drawer a fixed distance above the base of the latter such that said microfiche support arrangement, projection screen and optical arrangement are positionable entirely within the confines of said drawer, whereby to close the latter, and (ii) a second extended position above said retracted position such that, when said drawer is open, the operating area of planar movement of said microfiche supporting means extends over an adjacent one of said drawer panels and beyond said adjacent panel outside said drawer whereby the supported microfiche is movable outside said drawer while remaining in its operating area; and (f) a rigid stabilizing bar pivotally connected at one end to one lateral side of said housing support means and pivotally connected at its opposite end to an opposite lateral side of said housing means whereby to allow vertical movement of said housing means while laterally stabilizing the latter.

11. An assembly according to claim 10 wherein said housing means includes first and second opposite lateral sides and wherein said housing support means supports said housing means for substantially vertical movement between said retracted and extended positions, said housing support means including:

(a) a lowermost base plate serving as said reader base, said base plate having first and second opposite lateral sides in vertical alignment with the first and second sides of said housing means; and (b) first and second linking mechanisms connected with the first vertically aligned sides and the second vertically aligned sides of said housing means and said housing support means, respectively, and to said cover lid, each of said mechanisms including a pair of links interconnected to one another, to their associated lateral sides and to said lid to provide a scissor-type movement for raising and lowering said housing means between its retracted and extended position.

12. An assembly according to claim 11 wherein one of the links of each of said linking mechanisms has a top end pivotally connected with said housing means and a bottom end pivotally connected to said base plate and wherein the other of each of said linking mechanisms has a top end pivotally connected with said cover lid and a bottom end pivotally and slidably connected with said base plate, said links in each par being pivotally connected to one another at intermediate points along their lengths to provide said scissor-type movement.

13. An assembly according to claim 10 wherein said housing means includes first and second opposite lateral sides and wherein said housing support means supports said housing means such that the latter pivots about a given axis in its movement between said retracted and extended positions, said housing support means including (a) a lowermost base plate serving as said reader base, said base plate having first and second opposite lateral sides in vertical alignment with the first and second sides of said housing means;

(b) a pair of support arms fixedly connected to said base plate and pivotally connected to the housing means at the first vertically aligned sides of the latter, said arms together defining the axis of pivotal movement of said housing means; and (c) a pair of linking mechanisms interconnected with said base and said housing means at said second vertically aligned sides and with said lid for pivoting said housing means about said axis.

14. A microfiche reader assembly especially suitable for use in a desk drawer having a horizontal base, opposite upstanding side panels and upstanding front and back panels, said assembly comprising:

(a) a rectangular housing having a front side including a horizontal through slot, an opposite back side, opposite lateral sides and an opened top end;

(b) a cover lid pivotally connected with said housing for movement between a closed inoperative position extending substantially horizontally across the top opened end of said housing and an opened operating position extending upwardly and rearwardly of the front side of said housing at an incline with the horizontal, said cover lid containing a projection screen for movement therewith such that the screen is in said substantially horizontal position when the lid is closed and in said inclined position when the lid is open;

(c) a light blocking skirt pivotally connected with said housing for movement between a collapsed, substantially horizontally extending inoperative position within said housing and a raised operative position extending above the backside of said housing at an incline with the horizontal between said backside and the top end of said lid when the latter is in its raised position, said skirt being interlocked with said cover lid such that movement of the latter from its closed position to its opened position causes said skirt to move from its collapsed position to its extended position and such that movement of said lid from its opened position to its closed position causes said skirt to move from its extended position to its collapsed between;

(d) a microfiche support arrangement connected with and supported by said housing and including means supporting a microfiche, said microfiche support means being movable within the confines of a given rectangular operating area extending through said slot in the front side of said housing, whereby said operating area is divided into an inner sub-area located within the housing and an outer sub-area located outside said housing;

(e) optical means cooperating with a supported microfiche for projecting an enlarged image of a section of said microfiche onto said screen when said lid is in its opened position and the supported microfiche is in said operating area; and (f) housing support means adapted for positioning entirely within said drawer on the base of the latter and supporting said housing for pivotal movement about a given axis between (i) a first retracted position entirely within the confines of said drawer, a fixed distance above the base of the latter such that said cover lid including said projection screen, said skirt, said microfiche support arrangement and said optical arrangement are contained entirely within the confines of said drawer when said lid and said skirt are in their inoperative positions and said microfiche supporting means is located within the inner sub-area of the operating area, whereby said drawer can be closed, and (ii) a second raised position above said collapsed position such that, when said drawer is open, the operating area of planar movement of said microfiche extends over an adjacent one of said drawer panels and laterally beyond said adjacent panel outside said drawer whereby the microfiche supporting means is movable outside said drawer while remaining in said operating area.

15. An assembly according to claim 14 wherein said housing means includes a lowermost based plate adapted for mounting on the base of said drawer, a pair of support arms fixedly connected to said base plate and pivotally connected with said housing for supporting the latter for pivotal movement, and first and second linking mechanisms interconnecting together said lowermost base plate, said housing and said cover lid such that movement of the latter from its closed position to its opened position causes said housing to pivotally move from its collapsed position to its raised position and movement of said lid from its opened position to its closed position causes said housing to pivotally move from its raised position to its collapsed position.

16. An assembly according to claim 15 wherein each of said linking mechanisms includes first, second and third links, said first link being pivotally connected at one end to said base plate and at its other end to said second link, said second link also being pivotally connected with said housing for movement with the latter at a different point on said second link, and said third link having one end pivotally connected for movement with said second link at still a different point on the latter and its opposite end pivotally connected for movement with said lid such that movement of said lid between its closed and opened positions causes the three links to move between an overall collapsed position and a locked in place raised position.

17. An assembly according to claim 15 wherein each of said linking mechanism includes a single link pivotally connected at one end to said base plate and at its other end to said lid such that movement of the lid between its closed and opened positions causes said housing to move between a collapsed position and a raised position, said link being pivotally connected to said lid at a different point than the pivotal connection between said lid and housing.

18. A desk assembly comprising:
 (a) a desk including a drawer having a horizontal base, opposite upstanding side panels and upstanding front and back panels;
 (b) a microfiche reader including
   (i) a rectangular housing having a front side including a horizontal through slot, an opposite backside, and opposite lateral sides;
   (ii) means including a projection screen pivotally mounted to said housing for movement between a collapsed inoperative position extending substantially horizontally across the top of said housing and a raised operating position extending upwardly and rearwardly of the front side of said housing at an incline with the horizontal,
   (iii) a microfiche support arrangement connected with and supported by said housing and including means supporting a microfiche, said microfiche supporting means being movable within the confines of a given rectangular operating area extending through said slot in the front side of said housing, whereby said operating area is divided into an inner sub-area located within said housing and an outer sub-area located outside said housing,
   (iv) optical means cooperating with a supported microfiche for projecting an enlarged image of a section of said microfiche onto said screen when the latter is in its raised operating position and the supported microfiche is in said operating area, and
   (v) means mounted on the base of said drawer entirely within the latter and supporting said housing means for movement between a first retracted position entirely within the confines of said drawer a fixed distance above the base of the latter such that said microfiche support arrangement, said projection screen and said optical arrangement are positioned entirely within the confines of the drawer when said screen is in its inoperative position and said microfiche supporting means is located within the inner sub-area of said operating area, whereby said drawer may be closed, and a second extended position above said retracted position such that, when said drawer is open, the operating area of said planar movement of microfiche supporting means extends over an adjacent one of said drawer panels and beyond said adjacent panel outside the latter, whereby the supported microfiche is movable outside said drawer while remaining in its operating area.

19. A microfiche reader assembly especially suitable for use in a desk drawer comprising:
 (a) a housing;
 (b) means including a projection screen mounted to said housing for movement between a first inoperative position and a second operative position;
 (c) a microfiche support arrangement connected with and supported by said housing and including means for supporting a microfiche, said microfiche support means being movable within the confines of a given rectangular operating area;
 (d) optical means cooperating with the supported microfiche for projecting an enlarged image of a section of said microfiche onto the said screen when the latter is in its second operating position and the supported microfiche is in said operating area; and
 (e) means for moving said housing between a first lowered position and a second elevated position such that the operating area of movement of said microfiche supporting means is movable between a lowered position and an elevated position, said moving means including means interconnecting said housing and said screen including means such that movement of the screen including means between its operative and inoperative positions causes corresponding movement of said housing between its operative and inoperative positions.

20. A microfiche reader assembly especially suitable for use in a desk drawer comprising:
 (a) a housing;

(b) means including a projection screen mounted to said housing for movement between a first inoperative position and a second operative position, said screen including means including a lid and a separate means for containing said screen, each of said lid and last-named means being mounted to said housing for movement between said inoperative and operative positions, (c) means for moving said housing between a first lowered position and a second elevated position such that the operating area of movement of said microfiche supporting means is movable between a lowered position and an elevated position, said moving means including means interconnecting said housing and said lid such that movement of said lid between its operative and inoperative positions causes corresponding movement of said housing between its operative and inoperative positions.

21. A microfiche reader assembly especially suitable for use in a desk drawer having a horizontal base, opposite upstanding side panels and upstanding front and back panels, said assembly comprising:

(a) a rectangular housing having a front side including a horizontal through slot, an opposite back side, opposite lateral sides and an opened top end;

(b) means including a projection screen pivotally mounted to said housing for movement between collapsed inoperative, position extending substantially horizontally across the top opened end of said housing and a raised operating position extending upwardly and rearwardly of the front side of said housing at an incline with the horizontal;

(c) means for biasing said screen including means in its raised operating position;

(d) a cover lid pivotally connected with said housing for movement between a closed inoperative position extending substantially horizontally over said screen including means when the latter is in its collapsed position and an opened operating position extending up from the back side of said housing for engagement with said screen including means when the latter is in its raised position;

(e) a microfiche support arrangement connected with and supported by said housing and including means for supporting a microfiche, said microfiche support means being movable within the confines of a given rectangular operating area extending through said slot in the front side of said housing whereby said operating area is divided into an inner sub-area located within the housing and an outer sub-area located outside said housing;

(f) optical means cooperating with a supported microfiche for projecting an enlarged image of a section of said microfiche onto said screen when the latter is in its raised position and the supported microfiche is in said operating area;

(g) housing support means adapted for positioning entirely within said drawer on the base of the latter and supporting said housing for substantially vertical movement between (i) a first retracted position entirely within the confines of said drawer a fixed distance above the base of the latter such that said means including said projection screen, said cover lid, said microfiche support arrangement and said optical arrangement are contained entirely within the confines of said drawer when said screen including means and said lid are in their inoperative positions and said microfiche supporting means is located within the inner sub-area of the operating area, whereby said drawer can be closed, and (ii) a second extended position above said retracted position such that, when said drawer is open, the operating area of planar movement of said microfiche extends over an adjacent one of said drawer panels and laterally beyond said adjacent panel outside said drawer whereby the microfiche supporting means is movable outside said drawer while remaining in said operating area; and (h) said housing support means including a lowermost base plate adapted for mounting on the base of said drawer and first and second linking mechanisms interconnecting together said lowermost base plate, said housing and said cover lid such that movement of said lid from its closed position to its opened position causes said housing to move from its retracted position to its extended position and movement of said lid from its opened position to its closed position caused said housing to move from its extended position to its retracted position.

22. A microfiche reader assembly especially suitable for use in a desk drawer having a horizontal base, opposite upstanding side panels and upstanding front and back panels, said assembly comprising:

(a) a rectangular housing having a front side including a horizontal through slot, an opposite back side, opposite lateral sides and an opened top end;

(b) means including a projection screen pivotally mounted to said housing for movement between collapsed inoperative, position extending substantially horizontal across the top opened end of said housing and a raised operating position extending upwardly and rearwardly of the front side of said housing at an incline with the horizontal;

(c) means for biasing said screen including means in its raised operating position;

(d) a cover lid pivotally connected with said housing for movement between a closed inoperative position extending substantially horizontally over said screen including means when the latter is in its collapsed position and an opened operating position extending up from the back side of said housing for engagement with said screen including means when the latter is in its raised position;

(e) a microfiche support arrangement connected with and supported by said housing and including means for supporting a microfiche, said microfiche support means being movable within the confines of a given rectangular operating area extending through said slot in the front side of said housing whereby said operating area is divided into an inner sub-area located within the housing and an outer sub-area located outside said housing;

(f) optical means cooperating with a supported microfiche for projecting an enlarged image of a section of said microfiche onto said screen when the latter is in its raised position and the supported microfiche is in said operating area;

(g) housing support means adapted for positioning entirely within said drawer on the base of the latter and supporting said housing for substantially vertical movement between (i) a first retracted position entirely within the confines of said drawer a fixed distance above the base of the latter such that said means including said projection screen, said cover lid, said microfiche support arrangement and said optical arrangement are contained entirely within the confines of said drawer when said screen including means and said lid are in their inoperative positions and said microfiche supporting means is located within the inner sub-area of the operating area, whereby said drawer can be closed, and (ii) a second extended position above said retracted position such that, when said drawer is open, the operating area of planar movement of said microfiche extends over an adjacent one of said drawer panels and laterally beyond said adjacent panel outside said drawer whereby the microfiche supporting means is movable outside said drawer while remaining in said operating area; and (h) means for stabilizing said housing against lateral movement relative to said housing support means, said stabilizing means includes a pair of links pivotally connected to one another at intermediate points along their lengths, one of said links having a top end pivotally connected with said housing and a bottom end pivotally and slidably connected to said housing support means, the other of said links having a top end pivotally and slidably connected with said housing and a bottom end pivotally connected with said housing support means.

* * * * *